US009591345B2

(12) United States Patent
Pyhälammi et al.

(10) Patent No.: US 9,591,345 B2
(45) Date of Patent: Mar. 7, 2017

(54) GROUP EDITING OF MEDIA CONTENT STORED ON WIRELESS PORTABLE DEVICES

(75) Inventors: Seppo Pyhälammi, Helsinki (FI); Kaj Häggman, Espoo (FI); Jouni Soitinaho, Espoo (FI); Tuomo Sihvola, Espoo (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1909 days.

(21) Appl. No.: 10/970,329

(22) Filed: Oct. 21, 2004

(65) Prior Publication Data

US 2006/0090122 A1     Apr. 27, 2006

(51) Int. Cl.
| G06F 17/00 | (2006.01) |
| H04N 21/41 | (2011.01) |
| H04L 29/08 | (2006.01) |
| H04L 29/06 | (2006.01) |

(52) U.S. Cl.
CPC ......... H04N 21/4126 (2013.01); H04L 67/04 (2013.01); H04L 67/1095 (2013.01); H04L 67/38 (2013.01); H04L 69/329 (2013.01)

(58) Field of Classification Search
CPC ..... H04L 67/04; H04L 67/1095; H04L 67/38; H04L 69/329; H04N 21/4126
USPC ............... 715/500, 500.1; 455/3.06
See application file for complete search history.

(56) References Cited

U.S. PATENT DOCUMENTS

| 5,752,254 | A * | 5/1998 | Sakairi ........................... 715/530 |
| 7,584,244 | B2 | 9/2009 | Forstadius |
| 2002/0099697 | A1 * | 7/2002 | Jensen-Grey ..................... 707/3 |
| 2002/0197993 | A1 * | 12/2002 | Cho et al. ...................... 455/435 |
| 2003/0021591 | A1 * | 1/2003 | Grosvenor et al. ........... 386/124 |
| 2003/0050058 | A1 | 3/2003 | Walsh et al. |
| 2003/0069004 | A1 * | 4/2003 | Hamynen et al. ............. 455/412 |
| 2003/0125063 | A1 * | 7/2003 | Svensson et al. ............. 455/517 |
| 2003/0157959 | A1 | 8/2003 | Makela et al. |
| 2003/0222913 | A1 | 12/2003 | Mattila |
| 2004/0044774 | A1 * | 3/2004 | Mangalik et al. ............. 709/227 |

(Continued)

FOREIGN PATENT DOCUMENTS

| EP | 0744692 | 11/1996 |
| EP | 1271841 | 2/2003 |

(Continued)

OTHER PUBLICATIONS

International Search Report for International Application No. PCT/IB2005/003021, completed on Feb. 1, 2006.

(Continued)

*Primary Examiner* — Nathan Hillery

(74) *Attorney, Agent, or Firm* — Core Wireless Licensing Ltd.

(57) ABSTRACT

The invention provides for the communicating and editing of media files in wireless portable devices. The invention enables a user to manipulate displayed media content and other types of information stored in a personal media device. A master device may be coupled to a display device such as a television display and bonded to a slave device. A user may through use of either the slave device or the master device manipulate media content. The modified media content may be displayed substantially simultaneously on the television display, the master device, and the at least one slave device.

63 Claims, 5 Drawing Sheets

(56) References Cited

U.S. PATENT DOCUMENTS

2004/0203797 A1* 10/2004 Burr .............................. 455/445
2004/0205075 A1* 10/2004 LaTurner et al. ............. 707/100
2005/0165795 A1 7/2005 Myka et al.
2006/0031316 A1* 2/2006 Forstadius .................... 709/206
2006/0117046 A1* 6/2006 Robertson et al. ........... 707/101
2006/0146765 A1* 7/2006 Van De Sluis et al. ...... 370/338
2007/0094703 A1* 4/2007 Nygaard et al. .............. 725/135
2008/0021926 A1* 1/2008 Brock et al. ............... 707/104.1

FOREIGN PATENT DOCUMENTS

EP 1300770 9/2003
WO 2004075169 9/2004

OTHER PUBLICATIONS

European Search Report for European Application No. 05798820.6, dated Nov. 2, 2010.

* cited by examiner

GROUP EDITING OF MEDIA CONTENT STORED ON WIRELESS PORTABLE DEVICES

FIELD OF THE INVENTION

Aspects of the present invention relate generally to sharing and group editing digital media information. More specifically, aspects of the present invention concern group editing shared media content in wireless personal media devices.

BACKGROUND OF THE INVENTION

A variety of mobile computing devices exist, such as personal digital assistants (PDAs), mobile phones, digital cameras, digital players, mobile terminals, etc. (hereinafter referred to as "mobile devices"). These mobile devices perform various functions specific to the device and are often able to communicate via wireless connections with other devices. A single mobile device may, for example, provide Internet access, maintain a personal calendar, provide mobile telephony, and take digital photographs.

The sharing and editing of content found on multiple mobile computing devices is typically time consuming and limited. For example, a media event such as an anniversary party may warrant media capture of the special event. Each of the attendees of the special event may decide to capture the special event through use of digital photographs taken with their mobile devices. A considerable time after the event, the attendees may share their digital photographs with each other either manually or electronically. In addition, each of the attendees may spend considerable time editing the digital photographs prior to exchanging the digital photographs with other attendees. An attendee may edit what they believe to be the best picture when only later to discover that a better quality picture may have been utilized for editing if the user had access to other attendees' digital photographs. For these and other reasons, therefore, there remains a need for a system and method by which a user can more conveniently share and edit media content stored in wireless personal media devices in a proximity environment.

SUMMARY OF THE INVENTION

Aspects of the present invention are directed to communicating and group editing media content stored in media devices. A master device communicates and initiates a group session with at least one slave device. The master device and the at least one slave device may be personal media devices. A media file management application may communicate with the master device in order to provide instructions for group editing selected media content. The selected media content may be chosen from selected media content and related media content. The related media content may be stored in the at least one slave device and may displayed along with the selected media content on a first display of the at least one slave device. The selected media content may be edited to form an edited media content which may be displayed on the master device, the at least one slave device, and/or a television display.

These and other features of the invention will be apparent upon consideration of the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Example Operating Environment

Figure 1:
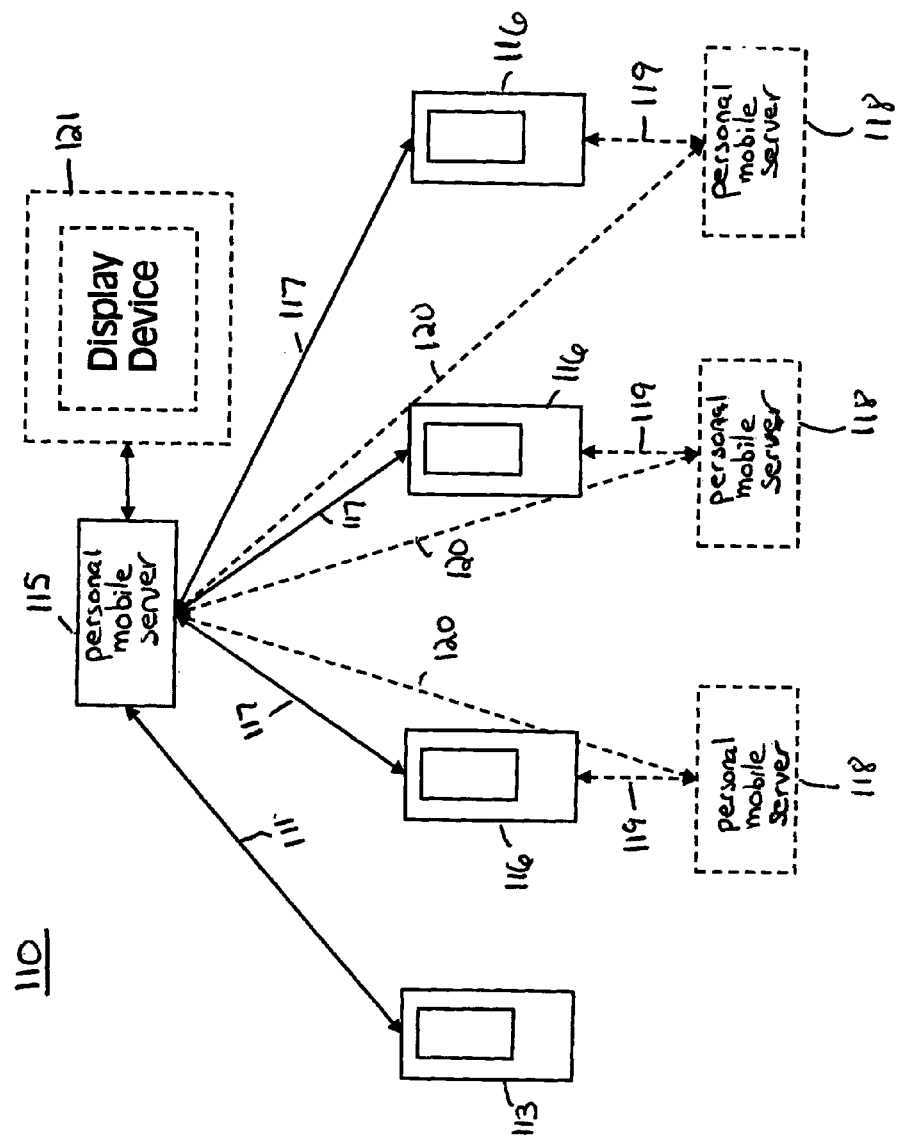
FIG. 1 is a block diagram of an example of a wireless communication system in which various aspects of the present invention may be implemented.

FIG. 1, one embodiment of the invention, shows an example of a wireless communication system 110 in which the systems and methods of the present invention may be advantageously employed. A master handset device 113 may be in communication 111 with or may be coupled to a personal mobile server or device, personal mobile content server or device, personal wireless server or device, wireless mobile server, portable media asset player or server, pocket-sized portable media asset player or server or similar device (115). The master handset personal mobile server 115 may provide all or part of the storage capacity the master handset 113 needs for storing media files. The master handset 113 may be a wireless communication device such as a PDA (personal digital assistant), cellular telephone, mobile terminal, or portable media device such as a digital camera, a digital video/audio recorder, a digital video/audio player, a global positioning system (GPS) receiver, or combinations thereof. For example, the master handset 113 may comprise a digital camera equipped cellular telephone or the like. Alternatively, the master handset 113 may be a remote controller device. The master handset personal mobile server 115 may comprise a desktop computer, laptop, set-top box, personal portable server, personal portable media player, network server, personal portable memory or other device capable of storing and accessing data.

One or more slave handsets 116 may be in communication 117 with the master handset personal mobile server 115. Each of the slave handsets 116 may be a wireless communication device such as a PDA (personal digital assistant), cellular telephone, mobile terminal, or portable media device such as a digital camera, a digital video/audio recorder, a digital video/audio player, a global positioning system (GPS) receiver, or combinations thereof. For example, a slave handset 116 may comprise a digital camera equipped cellular telephone or the like. Furthermore, each of the slave handsets 116 may comprise digital devices that communicate wirelessly but are limited to capturing text files, such as laptop computers. Additionally, the slave handset 116 may be in communication 119 with a slave handset personal mobile server 118, or may comprise an external personal mobile server 118 in communication with. The personal mobile server 118 may provide all or part of the storage capacity the slave handset 116 needs for storing media files. The slave handset personal mobile server 118 may comprise a desktop computer, laptop, set-top box, personal portable server, personal portable media player, network server, personal portable memory or other device capable of storing and accessing data.

Slave handsets 116 and master handset personal mobile server 115 may communicate in a variety of manners. For example, wireless communication system 110 may comprise standard forms of wireless communication including, BLUETOOTH, Wi-Fi, ultra wide band (UWB), low power radio frequency (LPRF), radio frequency identification (RFID), infrared communication, IrDA, third-generation (3 G) cellular data communications, Global System for Mobile communications (GSM), or other wireless communication networks. The master handset personal mobile server 115 may determine if a particular communication service is available from a slave handset device 116. For example, in a BLUETOOTH environment, at the time when a connection is made between BLUETOOTH devices, an exchange of unique BLUETOOTH identities, called global IDs, takes place. A device's global ID indicates its profile and functional capability. Upon matching of the device profile, a connection is made and as the devices exchange data, the BLUETOOTH transceiver chip hops back and forth among frequencies. In general, the master handset personal mobile server 115 may determine if a particular communication service is available from a slave handset device 116 by utilizing monitoring, bonding, authentication, and/or registration means and systems of the used wireless communication system.

Various slave personal mobile servers 118 may be in communication 120 with the master handset personal mobile server 115. Each of the slave handsets 116 may also be in communication 119 with a respective slave personal mobile server 118. In another embodiment of the invention, the master device or slave handset device may have a guest mode in which files may be sent to other devices such as a personal mobile server without the need to pair up the devices and set up passcodes.

Master handset personal mobile server 115 may also be connected to an external display such as a television display 121 in order to enhance the viewing experience of the user. The television display 121 may provide a larger viewing area for a user to display electronic images such as thumbnails or video clips.

Figure 2A:
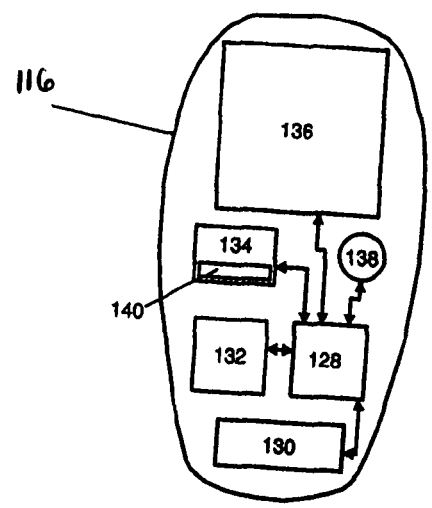
FIG. 2A is a block diagram of an illustrative slave device in accordance with an aspect of the present invention.

As shown in FIG. 2A, in one embodiment of the invention, slave handset 116 may include a processor 128 connected to user interface 130, wireless communications interface 132 (for short and/or distant communication), memory 134 and/or other storage, display 136, and digital camera 138 and/or other media capturing means. User interface 130 may further include a keypad, four arrow keys, joy-stick, data glove, mouse, roller ball, touch screen, voice interface, or the like. Software 140 may be stored within memory 134 and/or other storage to provide instructions to processor 128 for enabling slave handset 116 to perform various functions. For example, software 140 may configure processor 128 to enable slave handset 116 to take digital photographs via digital camera 138, to automatically name a photograph, to save photographs as image files, and to browse the Internet using communications interface 132. Although not shown, communications interface 132 could include wireless (e.g., BLUETOOTH, WLAN, WiFi or IrDA) interfaces configured to communicate over different communication links.

Figure 2B:
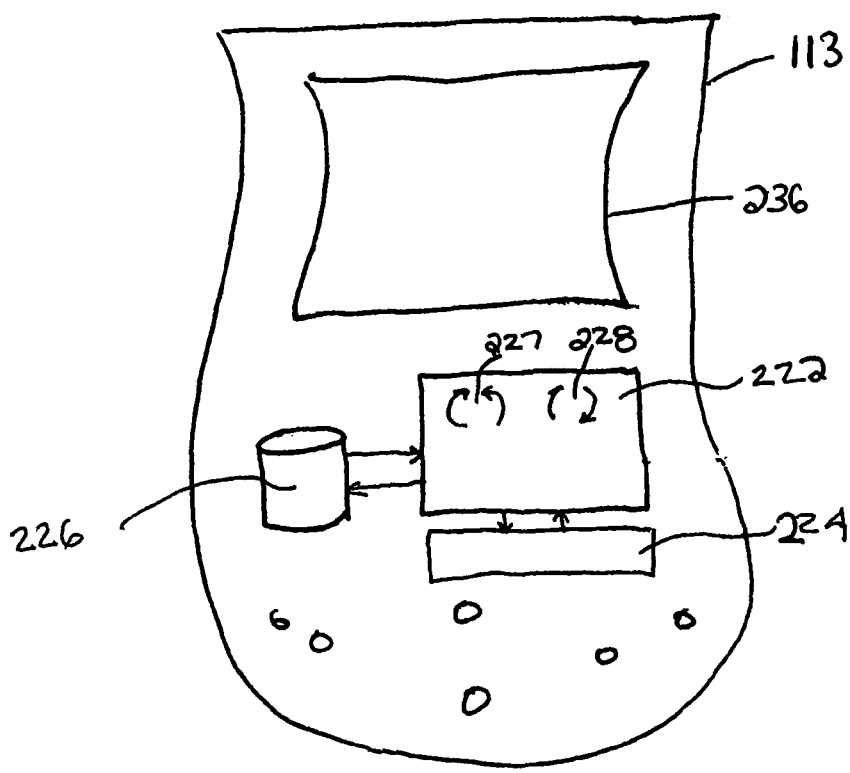
FIG. 2B is a block diagram of an illustrative master device in accordance with an aspect of the present invention.

Similarly, in an aspect of the invention master handset 113 may similar to the slave handset as describe above and illustrated in FIG. 2A. In an alternative aspect of the invention, master handset 113 may include a processor 222, a communications interface 224, memory 226 and/or other storage, and display 236 as shown in FIG. 2B. Software such as a bonding application 227 and a media transfer application 228 may be stored within memory 226 and/or other storage to provide instructions to processor 222 for enabling master handset 113 to perform various functions.

Figure 3:
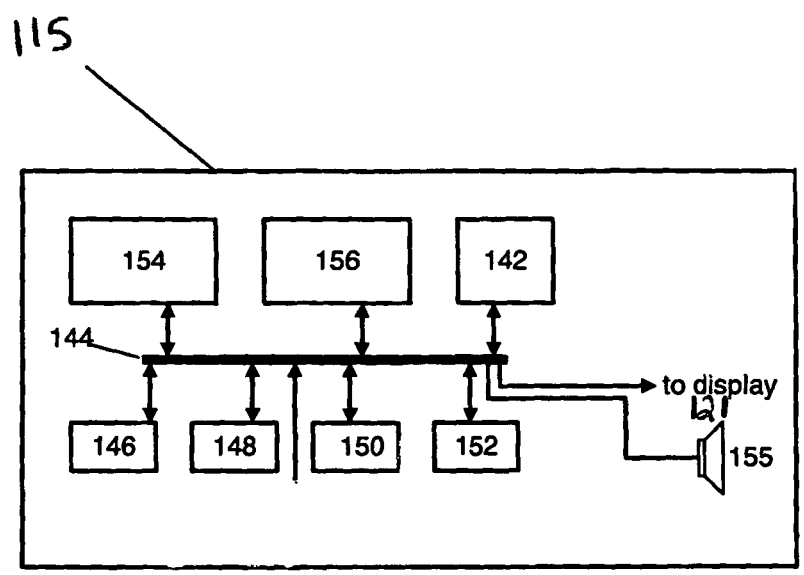
FIG. 3 is a block diagram of a master handset personal mobile server in accordance with an aspect of the present invention.

FIG. 3, one embodiment of the invention, provides an exemplary illustration of a master handset personal mobile server 115. The master handset personal mobile server 115 may include processor 142 coupled via bus 144 to one or more communications interfaces 146, 148, 150, and 152. Interface 146 may be a cellular telephone or other wireless network communications interface. There may be multiple different wireless network communication interfaces. Interface 148 may be a Wi-Fi system interface. Interface 150 may be a low power radio frequency (LPRF), or radio frequency identification (RFID) interface. Interface 152 may be a BLUETOOTH interface or any other short range wireless connection interface.

Master handset personal mobile server 115 may also include volatile memory 154 (e.g., RAM) and/or non-volatile memory 156 (such as a hard disk drive, tape system, or the like). Software and applications may be stored within memory 154 and/or memory 156 that provides instructions to processor 142 for enabling master handset personal mobile server 115 to perform various functions, such as processing file transfer requests (such as for image files), storing files in memory 154 or memory 156, displaying images and/or other data, and organizing images and/or other data. The invention may enable the combination of different types of media formats such as images, video, music, notes, presentation, and/or graphics, to be copied, moved or included into a one folder, cluster, presentation, or similar.

The other data may include but is not limited to video files, audio files, emails, SMS/MMS messages, weblog documents, other message files, text files, presentations, or other type of media files. Although shown as part of master handset personal mobile server 115, memory 156 could be remote storage coupled to master handset personal mobile server 115, such as an external drive or another storage device in communication with master handset personal mobile server 115. Master handset personal mobile server 115 may also be coupled to a display device 121 (FIG. 1) that may have a speaker, via a video interface (not shown). Display device 121 may be a computer monitor, a television set, an LCD projector, or other type of display device.

Similar to the master handset personal mobile server 115 embodiment of FIG. 3, slave personal mobile server 118 may comprise memory and a processor, the memory and the processor coupled via a bus to one or more communication interfaces.

Description of Illustrative Aspects of the Invention

In an aspect of the present invention, the master handset 113 may monitor a particular area of wireless coverage in order identify slave handsets 116. Monitoring an area of wireless coverage may require that the master handset 113 receive signals (i.e. presence information) from potential slave devices that are within close proximity of the master handset 113. Alternatively, monitoring the area of wireless coverage may require that the master handset 113 transmits signals to find potential slave devices that are within close proximity of the master handset 113. In an alternative aspect of the invention, a master handset personal mobile server 115 may receive any and all communication from the slave handsets 118 and relay the necessary information to master handset 113.

Upon receipt of a signal, master handset 113 will determine if the signals are coming from a new slave handset 116, which has yet to be bonded to master handset 113. If the device is identified as a new slave handset 116, the master handset 113 may send out a signal asking for bonding of the potential slave handset 116 and informing the device of media item transfer parameters.

Once the master handset 113 and the slave handset 116 have completed the bonding process, the slave handset 116 may transmit information to an intermediate device such as master headset personal mobile server 115 related to how media files will be shared. In this regard, the slave handset 116 may send to the master handset personal mobile server 115 the address of the receiving device (i.e., the device that will receive the collection of media files). In addition, the slave handsets 116 may send information to the master handset personal mobile server 115 related to collection editing parameters, i.e., requesting that certain media files be omitted or augmented before the master handset personal mobile server 115 communicates the collection to the slave handsets 116 or to the slave handsets personal mobile server 118. In addition, the information transmitted from the slave handset 116 or slave handsets personal mobile server 118 to the master handset personal mobile server 115 may include when to share the files (such as a certain time), or by request, in which file format, or via which network. In addition, the information transmitted from the slave handset 116 or slave handsets personal mobile server 118 to the master handset personal mobile server 115 may include information of the technical capabilities of the slave handset 116 and/or the slave handsets personal mobile server 118 or existence of a media file management application the slave handset 116 and/or the slave handsets personal mobile server 118. Once the master handset 113 has bonded with at least one slave handset 116 and the sharing information has been exchanged, the master handset personal mobile server 115 may receive media file communications from the bonded slave handsets 116 in accordance with the file transfer parameters. The media files communicated from the slave handsets 116 to the master handset personal mobile server 115 may include image files, video files, audio files, text documents, multimedia presentations and the like. Additionally, once the master handset 113 has bonded with at least one slave handset 116 and the sharing information has been exchanged, the master handset personal mobile server 115 may transmit media file communications to the bonded slave handsets 116 in accordance with the file transfer parameters. The media files communicated from the master personal mobile server 115 to the slave handset 116 may include image files, video files, audio files, text documents, multimedia presentations and the like. Additionally, if the receiving slave handset 116 or the slave handsets personal mobile server 118 does not include a media file management application, such as a media diary, the master handset personal mobile server 115 may transmit a media file management application to the slave handset 116 or the slave handsets personal mobile server 118.

For a more detailed description of the bonding process, see co-pending U.S. application Ser. No. 10/749,652 filed on Dec. 31, 2003 in the name of inventors Andreas Myka and Christian Lindholm, entitled "Media File Sharing, Correlation of Metadata Related to Shared Media Files and Assembling Shared Media File Collections." That application is herein incorporated by reference.

Upon bonding of the master handset 113 and the slave handsets 116, the master handset personal mobile server 115 may automatically or by user request execute a media management application, such as a media file management application such as Nokia Lifeblog or a file manager. The exemplary media management application may associate media content items with a moment of time, period of time, event, or any other metadata information so that the user can manage media content items according to a moment of time, period of time, event, or any other metadata information. The media management application may provide instructions for group editing a selected media item. The selected media item may be chosen from selected media content or related media content.

The term "period of time" is used herein to refer to both a time range, as well as, a particular moment in time. Typically, the period of time will be a specific date associated with a date that the media content was created or intended for. For example, if the media content is an image or video file of an anniversary party, the media application may categorize and store the media content according to the date of the anniversary party and/or the couple having the anniversary. For a complete description of the media file management application see co-pending U.S. patent application Ser. No. 10/715,187, filed on Nov. 17, 2003, in the name of inventor Myka et al., and assigned to the same assignee as the present invention. That application is herein incorporated by reference as if set forth fully herein.

Figure 4:
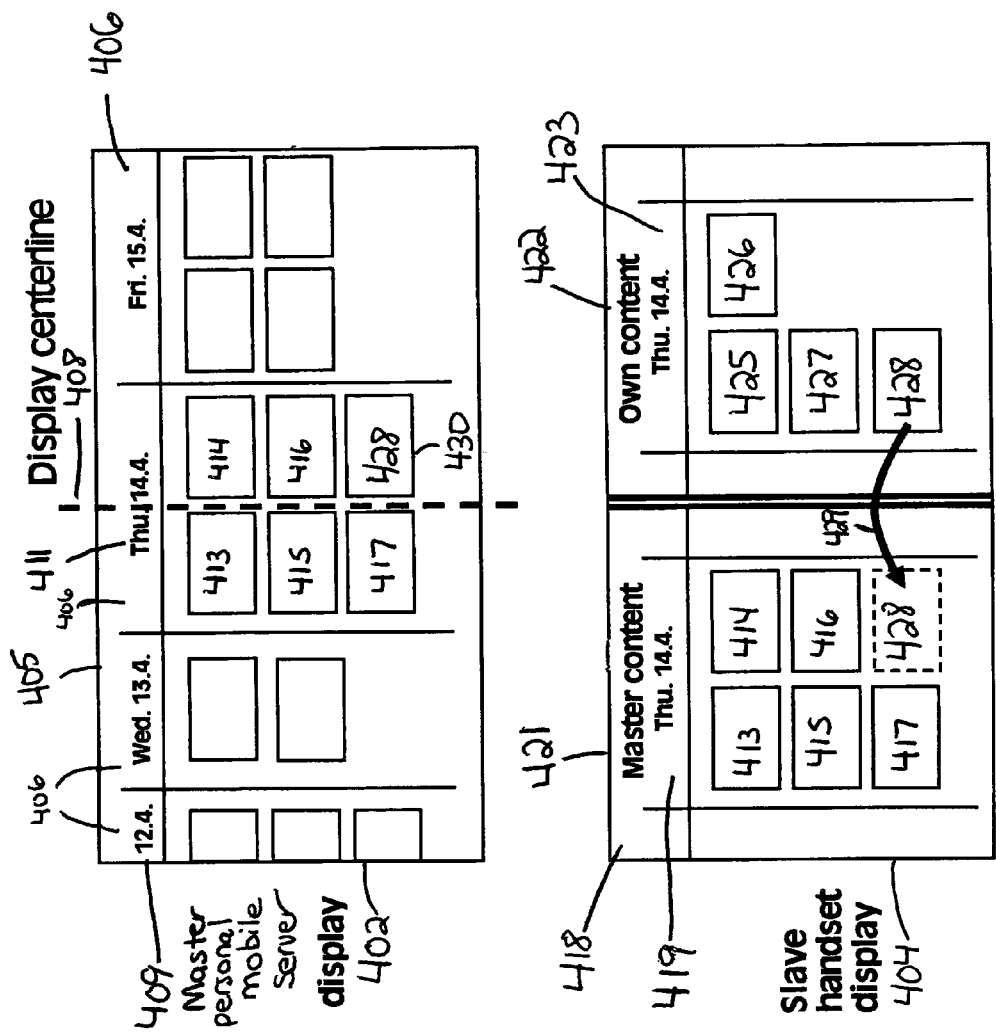
FIG. 4 shows a configuration for group editing media files in accordance with an aspect of the present invention.

FIG. 4, one embodiment of the invention, shows a configuration for group editing media items in accordance with an aspect of the present invention. In FIG. 4, an exemplary master personal mobile server display 402 is shown along with a corresponding slave handset display 404. As shown in master personal mobile server display 402, media content may be displayed in a calendar view 405, such in a time-line view 405. The calendar view 405 may include date columns 406, which may correspond to a specific date. For example, three full date columns and one partial date column are visible on the master personal mobile server display 402 corresponding to an active date (i.e., Thu. 14.4.) and dates preceding and subsequent to the active date. Typically, upon activation of the calendar view 405 the current date will be displayed in a middle column of the calendar view 405 with columns for the preceding dates positioned to the left and subsequent dates positioned sequentially to the right. As will be apparent, the calendar view 405 may be oriented differently, such as with rows as opposed to columns or with the current date displayed in alternative positions. In an alternate embodiment, the calendar view 405 may include columns which may correspond to different time periods such as years, months, hours or the like. Those skilled in the art will realize that the displays herein depicted and described is by way of example only; other master personal mobile server or slave handset displays that provide for the display of media item representations in association with a moment of time or a time period are also contemplated and within the inventive concepts herein disclosed.

As illustrated in FIG. 4, an active time period may be determined by, for example, a centerline of the display such as centerline 408 or by any other indication. Information regarding an active time period of time-line 409 and its associated media content displayed in master personal mobile server display 402 may be communicated from master headset personal mobile server 115 to slave handsets 116. For example, the information regarding active time period 411 (Thu. 14.4.) and the associated media items 413 through 417 may be communicated to the slave handsets 116 and displayed as shown in the slave handset display 404. The slave handsets 116 may display the received media content, such as media items 413 through 417, on the slave handset display 404 according to the time period 419 (Thu. 14.4.) in a master content area 421. The time period 419 may be part of a calendar view 418. The calendar view 418 may include date columns which may correspond to a specific date.

The slave handset display 404 may be divided into many sections including the master content section 421 and the slave headset's own content section 422. Similar to the master content section 421, the slave headset's own content section 422 may also include a time period 423 which may also be part of a calendar view 418. Alternatively, the whole content of the master personal mobile server display 402 may be transmitted to the slave handsets 116 and displayed as shown in the slave handset display 404. Additionally, the master content section 421 and the slave headset's own content section 422 may be displayed alone and/or toggled between in the display 404.

The slave handset's own content section 422 may include media content items 425 through 428. The media content items displayed in the slave handset's own content section 422 may be related to selected media content items displayed in the master content section 421 by time period information or by any other metadata. The slave handset's own content section 422 may display the related media items automatically. Selected and related media content items may represent an album, a collection, or a file folder. Furthermore, media content items 425 through 428 may include digital media files, such as digital images, digital video, digital audio, computer games, computer software, digital text files, emails, short message service (SMS) messages, multimedia message service (MMS) messages, weblog documents, or the like, to be accessible to the media diary user, in accordance with an aspect of the present invention. One example of a media content item that may be used throughout the various aspects of the present invention comprises an image such as a digital picture represented as a thumbnail image. Those skilled in the art will realize that the use of thumbnail images is illustrative of one form of media content items which may be used with the present invention.

A slave handset 116 utilizing its own media content items may transfer media content items to the master personal mobile server. For instance, selected media content items such as media content item 428 may be selected and copied or transmitted 429 to the master content section 421. The transmitted files are substantially immediately updated on the other displays as illustrated in master personal mobile server display 402 at 430 and/or also to other slave handset displays. Location of the transferred media files in the time-line of the master personal mobile server 115 or in a memory hierarchy may be determined by the active time period 411 in the time-line of the master personal mobile server 115 or by any other metadata of the transferred media files. In addition, the selected media content items may be moved or deleted. Alternatively, the slave handset 116 may transfer media content items from the master content section 421 to the own content section 422 and to the memory the slave handset 116. For instance, one or more selected media content items such as media content item 416 may be selected and copied or transmitted from the master content section 421. The transmitted files are substantially immediately updated on the own content section 422. Location of the transferred media files in the time-line display of the slave handset or in the memory hierarchy may be determined by the active time period 411 in the time-line of the master personal mobile server 115 or by any other metadata of the transferred media files.

In another aspect of the invention, when the master personal mobile server 115 is displaying and sharing a time-line presentation, the slave devices 116 may select any of their own content, such as an album, to be browsed and edited at the same time with the master personal mobile server 115 time-line presentations. Alternatively, any content such as albums or collections, in the master personal mobile server 115 may be shared and displayed in slave handset displays. Additionally, the time-period information from master personal mobile server 115 time-line presentation may be utilized to find media items from any albums in the slave handset 116 that match the time period or a certain range of time around the time period.

Figure 5:
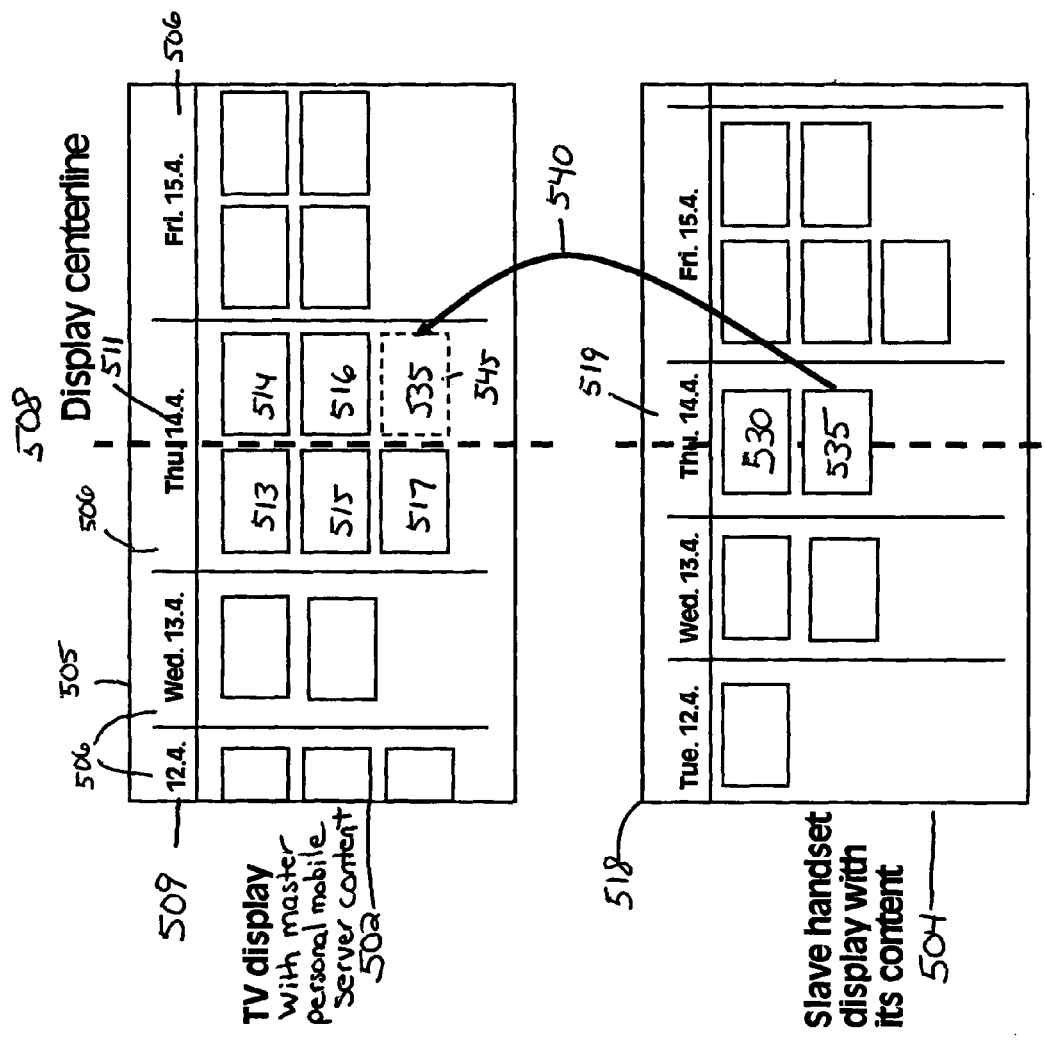
FIG. 5 shows an alternative configuration for group editing media files in accordance with an aspect invention.

FIG. 5, one embodiment of the invention, shows an alternative configuration for group editing media items in accordance with an aspect of the invention. In FIG. 5, an exemplary master personal mobile server display 502 is shown along with a corresponding slave handset display 504. The master personal mobile server display 502 may also be viewed on a television display 121. As noted above, the television display may be a computer monitor, a television set, a LCD projector, or other type of display device. The use of television display 121 or other external display device may enhance a user's group editing experience.

As shown in master personal mobile server display 502, media content may be displayed in a calendar view 505, such in a time-line view. The calendar view 505 may include date columns 506, which may correspond to a specific date. For example, three full date columns and one partial date column are visible on the master personal mobile server display 502 corresponding to an active date (i.e., Thu. 14.4.) and dates preceding and subsequent to the active date. Typically, upon activation of the calendar view 505, the current date will be displayed in a middle column of the calendar view 505 with columns for the preceding dates positioned to the left and subsequent dates positioned sequentially to the right. As will be apparent, the calendar view 505 may be oriented differently, such as with rows as opposed to columns or with the current date displayed in alternative positions. The calendar view 505 may be vertically scrollable, so that, all of the media content for a date column will be viewable by the user. In addition, the calendar view will typically be horizontally scrollable to provide for a view of other date or time columns 510.

In an alternative aspect of the calendar view, date columns 506 may include multiple time blocks (not shown) which may provide a descriptive area for information related to calendar events. In this alternative aspect of the invention, time blocks may be used to further partition the date columns 506. For example, the time blocks may be in increments of hours.

Calendar view 505 may include columns which may correspond to different time periods such as years, months, hours or the like. Those skilled in the art will realize that the displays herein depicted and described is by way of example only; other master personal mobile server or slave handset displays that provide for the display of media item representations in association with a moment of time or a time period are also contemplated and within the inventive concepts herein disclosed.

As illustrated in FIG. 5, an active time period may be determined by, for example, a centerline of the display such as centerline 508. Information regarding an active time period of time-line 509 and its associated media content displayed in master personal mobile server display 502 may be communicated from master headset personal mobile server 115 to slave handsets 116. For example, the information regarding active time period 511 (Thu. 14.4.) and the associated media items 513 through 517 may be communicated to the slave handsets 116. The slave handsets 116 may display its own media content, such as media content items 530 and 535, on the slave handset display 504 according to the time period 519 (Thu. 14.4.). The time period 519 may be part of a calendar view 518.

Media content items 530 and 535 displayed in the slave handset's display 504 may be related to selected media content items displayed in the master personal mobile server display 502. Selected and related media content items may represent an album, a collection, or a file folder. Furthermore, media content items may include digital media files, such as digital images, digital video, digital audio, computer games, computer software, digital text files, emails, short message service (SMS) messages, multimedia message service (MMS) messages or the like, to be accessible to the media diary user, in accordance with an aspect of the present invention. A slave handset 116 utilizing its own media content such as media content items 530 and 535 may transmit or copy media content items to the master personal mobile server 115 (and vice versa). For instance, selected media content items such as media content item 535 may be selected and transmitted 540 to master personal mobile server 515. The transferred files are substantially immediately updated on the other displays as illustrated in master personal mobile server display 502 at 545. Location of the transferred media files in the time-line of the master personal mobile server 115 or location in a relevant album, folder, collection, or similar may be determined by the active time period 411 in the time-line of the master personal mobile server 115 or by any other metadata information, such as a topic, an event, a location, or similar, or any combination thereof. In addition, master personal mobile server 115 may further edit the collected new content which may be stored in the master personal mobile server 115. In addition, the collected new content may be transmitted to bonded slave devices.

In another aspect of the invention, when the master personal mobile server 115 is displaying and sharing a time-line presentation, the slave devices 116 may select any of their own content, such as an album, to be browsed and edited at the same time with the master personal mobile server 115 time-line presentations. Alternatively, any content, such albums or collections, in the master personal mobile server 115 may be shared and displayed in slave handset displays. Additionally, the time-period information from master personal mobile server 115 time-line presentation may be utilized to find or search media items from any albums in the slave handset 116 that match the time period or a certain range of time around the time period. Additionally, any metadata information of the selected media content may be utilized to find or search media items from any albums in the slave handset 116.

In another aspect of the invention, media content items may include metadata information, in the form of a time-stamp, event name, file name, topic name, location information, or in the media file, objects in the media file, file type, file size or the like. The media item metadata may be automatically inputted at the time of the creation of the media item or may be manually inputted, such as at the time of creation of the media item or receipt or transfer of the media item. In addition, it is possible for the metadata to previously exist in the media file management application and to be associated with the digital media file at the moment the media item is created, if the device creating the media item executes the media file management application.

Once the media file management application receives the media file, the media item metadata may be combined and/or correlated with the calendar event metadata information, i.e., the date and time, the name of the event or the like. The combined and/or correlated metadata information is associated and stored with the media item in the media diary, such that, when a user accesses the media item via the media item representation the user will be presented with the combined metadata as the related content information has been identified through use of the metadata.

In another aspect of the invention, the master handset 113 may give mastering rights to the master personal mobile server and/or to the media file management application to some of the slave handsets 116 or to slave personal mobile servers for controlling the media file management application in the master personal mobile server, for example in order to download content from the master personal mobile server or to control displaying of the media content.

In another aspect of the invention, various slave personal mobile servers 118 may be in communication 120 with the master handset personal mobile server 115. Each of the slave handsets 116 may also be in communication 119 with a respective slave personal mobile server 118. This means, that in another aspect of the invention, the handset devices, both the master 113 and slaves 116, may be used as an I/O means or devices for the respective personal mobile servers, both the master 115 and the slaves 118. This further means that all the activities, functions, actions, or similar described in the invention may be executed by the personal mobile servers and/or between the personal mobile servers, as described in the FIG. 1.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention has been defined using the appended claims; however these claims are exemplary in that the invention is intended to include the elements and steps described herein in any combination or sub-combination. It will also be appreciated and understood that modifications may be made without departing from the true spirit and scope of the invention.

We claim:

1. An apparatus of a first device comprising at least one processor and at least one memory storing computer program code, wherein the at least one memory and stored computer program code are configured to, with the at least one processor, cause the apparatus to at least:
   receive selected media content and metadata about the selected media content from a second device, wherein the metadata describes a plurality of selected media items of the selected media content, and the selected media content is selected by the second device;
   search for related media content previously stored in the first device that is associated with the selected media content based on the metadata, the related media content comprising at least one related media item not included in the plurality of selected media items;
   access the related media content determined by searching;
   direct display of items for the selected media content and the accessed related media content substantially simultaneously on a display;

receive an indication that identifies one of the displayed items; and direct transfer of identified media content based on the indication.

2. The apparatus of claim 1, wherein the at least one memory and stored computer program code are configured to, with the at least one processor, cause the apparatus to direct transfer of identified media by:

copying the identified media content from the related media to the selected media; and directing transmission of the selected media content.

3. The apparatus of claim 1, wherein the selected media content comprises an album.

4. The apparatus of claim 1, wherein the first device comprises a mobile communication device.

5. The apparatus of claim 4, wherein the mobile communication device comprises a cellular telephone.

6. The apparatus of claim 1, wherein the directing transfer of identified media comprises:

receiving the identified media content.

7. The apparatus of claim 1, wherein the metadata includes information about an active time period and wherein the active time period specifies a range of time around a time moment.

8. The apparatus of claim 1 wherein the at least one memory and stored computer program code are configured to, with the at least one processor, further cause the apparatus to:

direct transmission of editing parameters that are indicative of omitting specified media files.

9. The apparatus of claim 1 wherein the at least one memory and stored computer program code are configured to, with the at least one processor, further cause the apparatus to:

direct transmission of sharing information about how media files will be shared.

10. The apparatus of claim 1 wherein the at least one memory and stored computer program code are configured to, with the at least one processor, further cause the apparatus to:

direct transmission of a specified time when to share media files.

11. The apparatus of claim 1 wherein the at least one memory and stored computer program code are configured to, with the at least one processor, further cause the apparatus to:

direct transmission of capability information of the apparatus, wherein the capability information defines one or more technical capabilities of the apparatus and is used to define in part how media files will be shared.

12. The apparatus of claim 1, wherein the at least one memory and stored computer program code are configured to, with the at least one processor, further cause the apparatus to:

receive information from a master device regarding an active time period of a time-line and selected media content associated with the active time period displayed on a display of the master device; and direct display of items for the selected media content and the accessed related media content substantially simultaneously based at least in part on the received information regarding the active time period and selected media content associated with the active time period.

13. The apparatus of claim 1, wherein the at least one memory and stored computer program code are configured to, with the at least one processor, further cause the apparatus to:

direct display of items for the selected media content and the accessed related content in a plurality of sections, wherein the plurality of sections comprise at least a first section including one or more items for the selected media content associated with a time period and a second section including one or more items for the accessed related content associated with the time period.

14. An apparatus of a master device comprising at least one processor and at least one memory storing computer program code, wherein the at least one memory and stored computer program code are configured to, with the at least one processor, cause the apparatus of the master device to at least:

direct transmission of selected media content and metadata about the selected media content to a slave device, wherein the metadata comprises an active time period and describes a plurality of selected media items of the selected media content, and the selected media content is selected by the master device;

receive related media content corresponding to the metadata from the slave device, the related media content comprising at least one related media item not included in the plurality of selected media items; and direct display of display items for the selected media content and the related media content concurrent with a separate graphical indication of the active time period on the display, wherein the at least one memory and stored computer program code are configured to, with the at least one processor, cause the apparatus of the master device to direct display of the related media content in a time-line presentation and the graphical indication of an active time period defines an active time period from among a plurality of time periods in the time-line presentation.

15. The apparatus of claim 14, wherein the selected media content comprises an album.

16. The apparatus of claim 14, wherein the master device comprises a mobile communication device.

17. The apparatus of claim 16, wherein the mobile communication device comprises a cellular telephone.

18. The apparatus of claim 14, wherein the at least one memory and stored computer program code are configured to, with the at least one processor, further cause the apparatus of the master device to:

bond to a slave device through a wireless communication medium.

19. The apparatus of claim 14, wherein the related media content comprises an album.

20. The apparatus of claim 14, wherein the related media content comprises a collection of media files.

21. The apparatus of claim 20, wherein the related media content comprises a file folder.

22. The apparatus of claim 14, wherein the metadata comprises time metadata.

23. The apparatus of claim 14, wherein the metadata comprises topic metadata.

24. The apparatus of claim 14, wherein the metadata comprises file type metadata.

25. The apparatus of claim 14, further comprising an interface to an intermediary device configured to implement a media file management application.

26. The apparatus of claim 14, wherein the time-line presentation comprises a plurality of sections corresponding to respective time periods, and wherein items of related media content are displayed in a section corresponding to a time period associated with the items of related media content.

27. A system comprising:
a slave device including:
  a first processor;
  a first display; and
  a first memory having stored therein machine executable instructions, that when executed, cause the slave device to:
    receive selected media content and metadata about the selected media content from a master device, wherein the metadata describes a plurality of selected media items of the selected media content, and the selected media content is selected by the master device;
    search for related media content previously stored in the slave device that is associated with the selected media content based on the metadata, the related media content comprising at least one related media item not included in the plurality of selected media items;
    access the related media content determined by searching;
    display items for the selected media content and the accessed related media content substantially simultaneously on the first display;
    receive an indication that identifies one of the display items; and
    transmit identified media content based on the indication; and
  a first communication interface for transmission of the identified media content stored in the first memory; and
the master device configured to monitor an environment for the at least one slave device, the master device further configured to bond to the slave device, the master device including:
  a second processor;
  a second display;
  a second communication interface through which the selected media content are transmitted to the slave device via a wireless communication network; and
  a second memory having stored therein machine executable instructions, that when executed, cause the master device to:
    transmit the selected media content and the metadata about the selected media content to the slave device,
    receive the identified media content from the slave device; and
    display the identified media content on the second display in a time-line presentation concurrent with a separate graphical indication defining an active time period from among a plurality of time periods in the time-line presentation.

28. The system of claim 27, wherein the identified media content is displayed substantially simultaneously on both the master device and the slave device.

29. The system of claim 27, further comprising an interface to a television display in communication with the master device, wherein the instructions in the second memory cause the television display to display media content corresponding to an active time period of a media file management application.

30. The system of claim 27, wherein the selected media content comprises an album.

31. The system of claim 27, wherein the slave device comprises a mobile communication device.

32. The system of claim 31, wherein the mobile communication device comprises a cellular telephone.

33. The system of claim 27, wherein the master device and the slave device are configured to bond by a wireless communication medium that is compatible with at least one of BLUETOOTH, a wireless local area network (WLAN), radio frequency identification (RFID), and a wireless telecom network.

34. The system of claim 27, wherein the related media content comprises a collection of media files.

35. The system of claim 27, wherein the related media content comprises a file folder.

36. The system of claim 27, wherein the metadata comprises time metadata.

37. The system of claim 27, wherein the metadata comprises topic metadata.

38. The system of claim 27, wherein the metadata comprises file type metadata.

39. The system of claim 27, wherein the metadata comprises a combination of metadata.

40. The system of claim 27, wherein the master device is configured to monitor the environment for the slave device by control of a master handset.

41. The system of claim 27, wherein the master device is configured to monitor the environment for at least one slave personal mobile server.

42. The system of claim 27, wherein the slave device is registered to communicate with the master device.

43. A non-transitory memory storing computer executable instructions that, when executed by at least one processor, cause a first device perform a method comprising:
  bonding the first device to a second device according to predetermined media file transfer parameters;
  receiving selected media content and metadata about the selected media content from the second device, wherein the metadata describes a plurality of selected media items of the selected media content, and the selected media content is selected by the second device;
  searching for related media content from previously stored content based on the metadata, the related media content comprising at least one related media item not included in the plurality of selected media items;
  accessing the related media content determined by searching;
  directing display of display items for the selected media content and the accessed related media content substantially simultaneously on the display;
  receiving an indication that identifies one of the display items; and
  directing transfer of identified media content based on the indication.

44. The memory of claim 43, said method further comprising:
  moving select media content from the related media content to the selected media.

45. The memory of claim 43, wherein the selected media content comprises an album.

46. The memory of claim 43, wherein the slave device comprises a mobile communication device.

47. The memory of claim 46, wherein the mobile communication device comprises a cellular telephone.

48. The memory of claim 43, wherein bonding the slave device to the master device includes bonding by a wireless communication medium that is compatible with at least one of BLUETOOTH, a wireless local area network (WLAN), radio frequency identification (RFID), and a wireless telecom network.

49. The memory of claim 43, wherein the related media content comprises a collection of media files.

50. The memory of claim 43, wherein the related media content comprises a file folder.

51. The memory of claim 43, wherein the metadata comprises time metadata.

52. The memory of claim 43, wherein the metadata comprises topic metadata.

53. The memory of claim 43, wherein the metadata comprises file type metadata.

54. A method comprising:
bonding a slave device to a master device according to predetermined media file transfer parameters;
receiving, at the slave device, selected media content and metadata about the selected media content from the master device, wherein the metadata describes a plurality of selected media items of the selected media content, and the selected media content is selected by the master device;
directing display of an indication of the metadata on a first display of the slave device;
directing display of the selected media content on the slave device;
searching for related media content previously stored in the slave device that is associated with the selected media content based on the metadata, the related media content comprising at least one related media item not included in the plurality of selected media items;
accessing the related media content determined by searching;
directing display of display items for the selected media content and the accessed related media content substantially simultaneously on the first display;
receiving an indication that identifies one of the display items; and
directing transfer of identified media content based on the indication.

55. The method of claim 54, wherein the master device comprises a second display to display the selected media content.

56. The method of claim 55, further comprising: interfacing to a television display in communication with the master device.

57. The method of claim 56, wherein directing display of the selected media content comprises directing display of the selected media content on the television display.

58. The method of claim 57, wherein the identified media content is substantially simultaneously displayed on the first display, the second display, and the television display.

59. The method of claim 55, wherein the identified media content is substantially simultaneously displayed on both the first display and the second display.

60. The method of claim 54, wherein the selected media content comprises an album.

61. The method of claim 54, wherein the slave device comprises a mobile communication device.

62. The method of claim 61, wherein the mobile communication device comprises a cellular telephone.

63. The method of claim 54, wherein the selected media content comprises a thumbnail image.

* * * * *